US011082803B2

(12) United States Patent
Liu et al.

(10) Patent No.: US 11,082,803 B2
(45) Date of Patent: Aug. 3, 2021

(54) DEVICE CONFIGURATION METHOD AND APPARATUS

(71) Applicant: Huawei Technologies Co., Ltd., Shenzhen (CN)

(72) Inventors: Yalin Liu, Shenzhen (CN); Guangzhu Zeng, Hangzhou (CN)

(73) Assignee: Huawei Technoiogies Co., Ltd., Shenzhen (CN)

( * ) Notice: Subject to any disclaimer, the term of this patent is extended or adjusted under 35 U.S.C. 154(b) by 0 days.

(21) Appl. No.: 16/165,094

(22) Filed: Oct. 19, 2018

(65) Prior Publication Data

US 2019/0053014 A1     Feb. 14, 2019

Related U.S. Application Data

(63) Continuation of application No. PCT/CN2017/077137, filed on Mar. 17, 2017.

(30) Foreign Application Priority Data

Apr. 20, 2016 (CN) .......................... 201610248218.8

(51) Int. Cl.
*H04W 4/029* (2018.01)
*H04W 28/08* (2009.01)
(Continued)

(52) U.S. Cl.
CPC .......... *H04W 4/029* (2018.02); *H04W 4/027* (2013.01); *H04W 28/08* (2013.01); *H04W 64/00* (2013.01); *H04W 76/27* (2018.02); *H04W 88/02* (2013.01)

(58) Field of Classification Search
CPC ..... H04W 4/029; H04W 76/27; H04W 4/027; H04W 28/08; H04W 64/00; H04W 88/02; H04W 64/003
See application file for complete search history.

(56) References Cited

U.S. PATENT DOCUMENTS 9,107,173 B2    8/2015    Gao et al.
9,973,243 B2    5/2018    Zhang et al.
(Continued)

FOREIGN PATENT DOCUMENTS

CN     102958084 A     3/2013
CN     103379437 A    10/2013
(Continued)

OTHER PUBLICATIONS

Jin et al., "Dynamic Clustering for Object Tracking in Wireless Sensor Networks", 2006, Dept. of Computer Science and Engineering, Korea University Seoul 136-701, Korea, 10 pages. (Year: 2006).*

(Continued)

*Primary Examiner* — Quoc Thai N Vu
(74) *Attorney, Agent, or Firm* — Slater Matsil, LLP

(57) ABSTRACT

A device configuration method and apparatus are provided, and relate to the field of communications technologies. The method is applied to a management device that manages n transmission devices, n≥2, and the method includes: determining a transmission device accessed by user equipment UE; grouping m transmission devices including the transmission device accessed by the UE into a tracking set, where 1≤m<n; and sending tracking configuration information to each transmission device in the tracking set, where the tracking configuration information is sent to the UE by the transmission device that is in the tracking set and that is currently accessed by the UE, to instruct the UE to send a tracking signal, and the tracking signal is used to determine a location of the UE.

20 Claims, 5 Drawing Sheets

(51) Int. Cl.
H04W 64/00 (2009.01)
H04W 76/27 (2018.01)
H04W 4/02 (2018.01)
H04W 88/02 (2009.01)

(56) References Cited

U.S. PATENT DOCUMENTS

| | | |
|---|---|---|
| 2006/0140143 A1 | 6/2006 | Bauer |
| 2006/0176847 A1 | 8/2006 | Chen et al. |
| 2007/0015511 A1* | 1/2007 | Kwun ................ H04W 36/30 455/436 |
| 2013/0316730 A1 | 11/2013 | Ding |
| 2013/0336176 A1 | 12/2013 | Rubin et al. |
| 2015/0003263 A1* | 1/2015 | Senarath ............... H04L 5/0007 370/252 |
| 2015/0230224 A1 | 8/2015 | Maaref et al. |
| 2015/0319686 A1 | 11/2015 | Hedberg et al. |
| 2015/0334670 A1 | 11/2015 | Li et al. |
| 2016/0183222 A1 | 6/2016 | Suzuki et al. |
| 2017/0111763 A1* | 4/2017 | Morgan ................ H04W 4/029 |
| 2017/0332265 A1* | 11/2017 | Lui ....................... H04W 24/10 |

FOREIGN PATENT DOCUMENTS

| | | |
|---|---|---|
| CN | 103718612 A | 4/2014 |
| CN | 104838699 A | 8/2015 |
| CN | 105340315 A | 2/2016 |
| CN | 105376748 A | 3/2016 |
| CN | 105409308 A | 3/2016 |

OTHER PUBLICATIONS

Huawei et al.,"Considerations on New Radio Operation for Ultra Dense Networks", 3GPP TSG RAN WG1 Meeting #84bis, R1-162164, Apr. 11-15, 2016, 7 pages, Busan, Korea.

* cited by examiner

DEVICE CONFIGURATION METHOD AND APPARATUS

CROSS-REFERENCE TO RELATED APPLICATIONS

This application is a continuation of International Application No. PCT/CN2017/077137, filed on Mar. 17, 2017 which claims priority to Chinese Patent Application No. 201610248218.8, filed on Apr. 20, 2016. The disclosures of the aforementioned applications are hereby incorporated by reference in their entireties.

TECHNICAL FIELD

This application relates to the field of communications technologies, and in particular, to a device configuration method and apparatus.

BACKGROUND

A non-cellular communications system may include at least a transmit point (TP), a logic entity (LE) managing the TP, and user equipment (UE) accessing the TP. The LE needs to configure the TP to track a location of the UE, so as to determine, based on the location of the UE, the TP that performs data transmission with the UE.

Specifically, the LE sends tracking configuration information to all TPs managed by the LE, and each TP sends the tracking configuration information to UE that accesses the TP, so that each UE sends a tracking signal based on the tracking configuration information. Based on the tracking configuration information, the TPs detect tracking signals sent by all UEs, and send signal strength of the detected tracking signals to the LE. The LE determines locations of the UEs based on the signal strength.

When the LE sends the tracking configuration information, a relatively large quantity of channel resources need to be occupied.

SUMMARY

This application provides a device configuration method and apparatus, to resolve a problem that a relatively large quantity of channel resources are occupied when an LE sends tracking configuration information to all TPs managed by the LE.

According to a first aspect, a device configuration method is provided and is applied to a management device that manages n transmission devices, n≥2. The method includes determining a transmission device accessed by UE. The method also includes grouping m transmission devices including the transmission device accessed by the UE into a tracking set, where 1≤m<n. The method also includes sending tracking configuration information to each transmission device in the tracking set, where the tracking configuration information is sent to the UE by the transmission device that is in the tracking set and that is currently accessed by the UE, to instruct the UE to send a tracking signal, and the tracking signal is used to determine a location of the UE.

The tracking set is determined based on the transmission device accessed by the UE, and the tracking configuration information is sent to the transmission devices in the tracking set, so that the management device does not need to send the tracking configuration information to all the transmission devices managed by the management device, thereby resolving a problem that a relatively large quantity of channel resources are occupied because the management device sends the tracking configuration information to all the transmission devices managed by the management device, and saving the channel resources.

With reference to the first aspect, in a first implementation of the first aspect, the grouping m transmission devices including the transmission device accessed by the UE into a tracking set includes: determining remaining m−1 transmission devices based on the transmission device accessed by the UE, where a coverage area of at least one of the m−1 transmission devices is adjacent to a coverage area of the transmission device accessed by the UE. The grouping also includes grouping the transmission device accessed by the UE and the remaining m−1 transmission devices into the tracking set.

A transmission device whose coverage area is adjacent to the coverage area of the transmission device accessed by the UE is used as a transmission device in the tracking set. When the UE moves, the UE usually moves from a coverage area to another coverage area adjacent to the coverage area. Therefore, a transmission device accessed by the UE after the UE moves is still in the tracking set, so that the UE can receive the tracking configuration information using the transmission device accessed by the UE after the UE moves. This resolves a problem that when a coverage area of the transmission device in the tracking set is not adjacent to the coverage area of the transmission device accessed by the UE, the UE cannot receive the tracking configuration information after the UE moves, thereby improving location tracking accuracy.

With reference to the first aspect, in a second implementation of the first aspect, the grouping m transmission devices including the transmission device accessed by the UE into a tracking set includes: obtaining a movement attribute of the UE, and grouping, based on the movement attribute, the m transmission devices including the transmission device accessed by the UE into the tracking set, where the movement attribute is used to indicate a movement status of the UE.

With reference to the second implementation of the first aspect, in a third implementation of the first aspect, the movement attribute includes at least a static state and a moving state, and the grouping, based on the movement attribute, the m transmission devices including the transmission device accessed by the UE into the tracking set includes: when the movement attribute of the UE is the static state, grouping the transmission device accessed by the UE into the tracking set. The grouping also includes when the movement attribute of the UE is the moving state, determining remaining m−1 transmission devices based on the transmission device accessed by the UE, where coverage areas of the remaining m−1 transmission devices are adjacent to a coverage area of the transmission device accessed by the UE, and m is positively correlated to a moving speed of the UE.

When the movement attribute of the UE is the static state, because the UE does not move, the UE does not access another transmission device. In this case, only the currently accessed transmission device needs to be configured for the UE, to ensure that the UE can receive the tracking configuration information. When the movement attribute of the UE is the moving state, UE with a fast moving speed passes through a relatively large quantity of coverage areas. In this case, a relatively large quantity of transmission devices need to be configured for the UE, to increase a probability that a transmission device accessed by the UE after the UE moves is still in the tracking set, so as to increase a probability that the UE can receive the tracking configuration information using the transmission device accessed by the UE after the UE moves. UE with a slow moving speed passes through a relatively small quantity of coverage areas. In this case, a relatively small quantity of transmission devices need to be configured for the UE, and it can be ensured that a transmission device accessed by the UE after the UE moves is still in the tracking set, so that the UE can receive the tracking configuration information using the transmission device accessed by the UE after the UE moves, and a channel resource occupied by the management device to send the tracking configuration information to the transmission devices in the tracking set can be reduced.

With reference to the third implementation of the first aspect, in a fourth implementation of the first aspect, the determining, when the movement attribute of the UE is the moving state, remaining m−1 transmission devices based on the transmission device accessed by the UE includes: when the moving speed of the UE is less than an $i^{th}$ speed threshold, determining, as the remaining m−1 transmission devices, transmission devices at a first layer to an $i^{th}$ layer that are determined based on the transmission device accessed by the UE. Additionally or alternatively, the determining includes when the moving speed of the UE is greater than an $i^{th}$ speed threshold, determining, as the remaining m−1 transmission devices, transmission devices at a first layer to an $(i+1)^{th}$ layer that are determined based on the transmission device accessed by the UE.

A coverage area of each transmission device at the $i^{th}$ layer is adjacent to a coverage area of a transmission device at the $(i-1)^{th}$ layer, and i≥1.

When the UE moves, the UE usually moves from a coverage area to another coverage area adjacent to the coverage area, and then moves from the adjacent coverage area to another coverage area adjacent to the coverage area, and a higher moving speed of the UE leads to a larger quantity of coverage areas through which the UE passes. Therefore, a transmission device accessed by the UE after the UE moves can be still in the tracking set by determining transmission devices layer by layer based on the moving speed of the UE, so that the UE can receive the tracking configuration information using the transmission device accessed by the UE after the UE moves. This resolves a problem that when coverage areas of transmission devices at each layers are not adjacent, the UE cannot receive the tracking configuration information after the UE moves, thereby improving location tracking accuracy.

With reference to any one of the second implementation to the fourth implementation of the first aspect, in a fifth implementation of the first aspect, the sending tracking configuration information to each transmission device in the tracking set includes: configuring the tracking configuration information based on the movement attribute. The sending also includes sending the tracking configuration information to each transmission device in the tracking set, or sending the tracking configuration information to the transmission device accessed by the UE, so that the transmission device accessed by the UE sends the tracking configuration information to the remaining m−1 transmission devices in the tracking set.

The tracking configuration information is sent to the transmission device accessed by the UE, so that the management device needs to send the tracking configuration information to only one transmission device, thereby further saving channel resources. The tracking configuration information is sent to each transmission device in the tracking set, so that the transmission device accessed by the UE does not need to send the tracking configuration information to the remaining m−1 transmission devices in the tracking set, thereby reducing transmission pressure of the transmission device.

With reference to the fifth implementation of the first aspect, in a sixth implementation of the first aspect, the tracking configuration information includes a time-frequency resource of a channel occupied by the tracking signal, and the configuring the tracking configuration information based on the movement attribute includes: configuring time-frequency resources on a same time-frequency resource block for at least two UEs having a same movement attribute, and configuring time-frequency resources on different time-frequency resource blocks for at least two UEs having different movement attributes, where the same time-frequency resource block means that at least two time-frequency resources belong to a same frequency band and a same time period. The configuring also includes the different time-frequency resource blocks mean that at least two time-frequency resources belong to a same frequency band but different time periods, or the at least two time-frequency resources belong to different frequency bands but a same time period, or the at least two time-frequency resources belong to different frequency bands and different time periods.

The time-frequency resources on the same time-frequency resource block are configured for the at least two UEs having the same movement attribute, and the time-frequency resources on the different time-frequency resource blocks are configured for the at least two UEs having the different movement attributes, so that when the at least two UEs having the different movement attributes send a same tracking signal, the transmission device can determine, based on the time-frequency resource blocks corresponding to the time-frequency resources used by the UEs to send the tracking signal, specific UE that sends the tracking signal, so as to multiplex the same tracking signal on the different time-frequency resource blocks.

With reference to the fifth implementation of the first aspect, in a seventh implementation of the first aspect, the tracking configuration information includes a tracking signal cycle, and the configuring the tracking configuration information based on the movement attribute includes: configuring a cycle greater than a preset threshold for UE whose movement attribute is the static state. The configuring also includes configuring a cycle less than the preset threshold for UE whose movement attribute is the moving state.

Because signal strength of a tracking signal sent by the UE in the static state varies very slightly, even if a relatively long tracking signal sending cycle is configured for the UE in the static state, tracking signal detection accuracy of the transmission device is still relatively high, and the transmission device can detect, in each cycle, tracking signals sent by more UEs. This increases a maximum quantity of UEs allowed to access the transmission device. In addition, in a same time period, a quantity of times of sending a tracking signal by UE with a long cycle is less than a quantity of times of sending a tracking signal by UE with a short cycle. This saves a channel resource occupied for sending a tracking signal. Because signal strength of a tracking signal sent by the UE in the moving state varies very significantly, a relatively short tracking signal sending cycle needs to be configured for the UE in the moving state, so as to improve tracking signal detection accuracy of the transmission device.

With reference to the fifth implementation of the first aspect, in an eighth implementation of the first aspect, the tracking configuration information includes a tracking signal identifier, and the configuring the tracking configuration information based on the movement attribute includes: configuring identifiers of tracking signals with different lengths but a same root sequence for at least two UEs having different movement attributes. Additionally or alternatively, the configuring includes configuring identifiers of tracking signals with a same length but different root sequences for at least two UEs having different movement attributes.

The different tracking signal identifiers are configured for the at least two UEs having the different movement attributes, so that when the UEs send, using a same time-frequency resource, tracking signals corresponding to the different identifiers, the transmission device can determine, based on the tracking signals, specific UE that sends the tracking signal. Therefore, different UEs can send tracking signals using a same time-frequency resource, so that time-frequency resources are saved.

With reference to the second implementation of the first aspect, in a ninth implementation of the first aspect, the obtaining a movement attribute of the UE includes: obtaining the movement attribute of the UE that is reported by the transmission device accessed by the UE, where the movement attribute is sent by the UE to the transmission device using a random channel when the UE accesses the transmission device, or the movement attribute is sent by the UE to the transmission device using radio resource control (RRC) signaling or network attached storage (NAS) signaling. Additionally or alternatively, the obtaining includes determining signal strength of the tracking signal based on the tracking signal sent by the UE, and determining the movement attribute of the UE based on the signal strength and a tracking signal cycle carried in the tracking configuration information, where the tracking signal is sent by the UE based on the tracking configuration information.

The movement attribute reported by the transmission device accessed by the UE is obtained, so that the management device can obtain the movement attribute of the UE without a need to analyze a tracking signal detection result reported by the transmission device, thereby saving processing resources of the management device.

The movement attribute is determined based on the tracking signal cycle carried in the tracking configuration information, and the signal strength of the tracking signal sent by the UE based on the tracking configuration information, so that the management device can learn the movement attribute of the UE, thereby improving movement attribute accuracy.

With reference to any one of the first aspect and the first to the ninth implementations of the first aspect, in a tenth implementation of the first aspect, after the sending tracking configuration information to each transmission device in the tracking set, the method further includes: determining the location of the UE and a moving path of the UE. The method also includes predicting, based on the location and the moving path, a transmission device to be accessed by the UE. The method also includes adding, to the tracking set, k transmission devices including the transmission device to be accessed by the UE, where k<n.

The transmission device to be accessed by the UE is predicted based on the location and the moving path of the UE, and the k transmission devices including the to-be-accessed transmission device are added to the tracking set, so that when the UE moves, a transmission device in the tracking set can always send the tracking configuration information to the UE, thereby improving location tracking accuracy.

According to a second aspect, a device configuration method is provided and is applied to a transmission device currently accessed by UE, the transmission device is one of m transmission devices in a tracking set, the tracking set is determined by a management device based on n managed transmission devices, 1≤m<n. The method includes receiving tracking configuration information sent by the management device, and sending the tracking configuration information to the UE, where the tracking configuration information is used to instruct the UE to send a tracking signal, and the tracking signal is used to determine a location of the UE.

The management device sends the tracking configuration information to the transmission devices in the tracking set determined by the management device, and the transmission device that is in the tracking set and that is currently accessed by the UE receives the tracking configuration information, so that the management device does not need to send the tracking configuration information to all the transmission devices managed by the management device, thereby resolving a problem that a relatively large quantity of channel resources are occupied because the management device sends the tracking configuration information to all the transmission devices managed by the management device, and saving the channel resources.

With reference to the second aspect, in a first implementation of the second aspect, before the receiving tracking configuration information sent by the management device, the method further includes: obtaining a movement attribute of the UE, where the movement attribute is used to indicate a movement status of the UE. The method also includes sending the movement attribute to the management device, where the movement attribute is used to instruct the management device to configure the tracking configuration information and the tracking set.

With reference to the second aspect or the first implementation of the second aspect, in a second implementation of the second aspect, the receiving tracking configuration information sent by the management device includes: receiving the tracking configuration information and identifiers of remaining m−1 transmission devices in the tracking set that are sent by the management device, and forwarding the tracking configuration information to the remaining m−1 transmission devices. Additionally or alternatively, the receiving includes receiving the tracking configuration information sent by the management device, where the tracking configuration information is sent by the management device to each transmission device in the tracking set.

The transmission device accessed by the UE receives the tracking configuration information sent by the management device, so that the management device needs to send the tracking configuration information to only one transmission device, thereby further saving channel resources. The m transmission devices in the tracking set receive the tracking configuration information sent by the management device, so that the transmission device accessed by the UE does not need to send the tracking configuration information to the remaining m−1 transmission devices in the tracking set, thereby reducing transmission pressure of the transmission device.

With reference to the first implementation of the second aspect, in a third implementation of the second aspect, the tracking configuration information includes a time-frequency resource of a channel occupied by the tracking signal, and the sending the tracking configuration information to the UE includes: sending time-frequency resources on a same time-frequency resource block to at least two UEs having a same movement attribute, and sending time-frequency resources on different time-frequency resource blocks to at least two UEs having different movement attributes, where the same time-frequency resource block means that at least two time-frequency resources belong to a same frequency band and a same time period. The sending also includes the different time-frequency resource blocks mean that at least two time-frequency resources belong to a same frequency band but different time periods, or the at least two time-frequency resources belong to different frequency bands but a same time period, or the at least two time-frequency resources belong to different frequency bands and different time periods.

The time-frequency resources on the same time-frequency resource block are sent to the at least two UEs having the same movement attribute, and the time-frequency resources on the different time-frequency resource blocks are sent to the at least two UEs having the different movement attributes, so that when the at least two UEs having the different movement attributes send a same tracking signal, the transmission device can determine, based on the time-frequency resource blocks corresponding to the time-frequency resources used by the UEs to send the tracking signal, specific UE that sends the tracking signal, so as to multiplex the same tracking signal on the different time-frequency resource blocks.

With reference to the first implementation of the second aspect, in a fourth implementation of the second aspect, the tracking configuration information includes a tracking signal cycle, and the sending the tracking configuration information to the UE includes: sending a cycle greater than a preset threshold to UE whose movement attribute is a static state. The sending also includes sending a cycle less than the preset threshold to UE whose movement attribute is a moving state.

Because signal strength of a tracking signal sent by the UE in the static state varies very slightly, even if a relatively long tracking signal sending cycle is configured for the UE in the static state, tracking signal detection accuracy of the transmission device is still relatively high, and the transmission device can detect, in each cycle, tracking signals sent by more UEs. This increases a maximum quantity of UEs allowed to access the transmission device. In addition, in a same time period, a quantity of times of sending a tracking signal by UE with a long cycle is less than a quantity of times of sending a tracking signal by UE with a short cycle. This saves a channel resource occupied for sending a tracking signal.

Because signal strength of a tracking signal sent by the UE in the moving state varies very significantly, a relatively short tracking signal sending cycle needs to be configured for the UE in the moving state, so as to improve tracking signal detection accuracy of the transmission device.

With reference to the first implementation of the second aspect, in a fifth implementation of the second aspect, the tracking configuration information includes a tracking signal identifier, and the sending the tracking configuration information to the UE includes: sending identifiers of tracking signals with different lengths but a same root sequence to at least two UEs having different movement attributes. Additionally or alternatively, the sending includes sending identifiers of tracking signals with a same length but different root sequences to at least two UEs having different movement attributes.

The different tracking signal identifiers are sent to the at least two UEs having the different movement attributes, so that when the UEs send, using a same time-frequency resource, tracking signals corresponding to the different identifiers, the transmission device can determine, based on the tracking signals, specific UE that sends the tracking signal. Therefore, different UEs can send tracking signals using a same time-frequency resource, so that time-frequency resources are saved.

With reference to the first implementation of the second aspect, in a sixth implementation of the second aspect, the obtaining a movement attribute of the UE includes: obtaining the movement attribute sent by the UE using a random channel when the UE accesses the transmission device. Additionally or alternatively, the obtaining includes obtaining the movement attribute sent by the UE using RRC signaling or NAS signaling. Additionally or alternatively, the obtaining includes determining signal strength of the tracking signal based on the tracking signal sent by the UE, and determining the movement attribute of the UE based on the signal strength and a tracking signal cycle carried in the tracking configuration information, where the tracking signal is sent by the UE based on the tracking configuration information.

The movement attribute reported by the transmission device accessed by the UE is obtained, so that the transmission device can obtain the movement attribute of the UE without a need to detect the tracking signal sent by the UE, thereby saving processing resources of the transmission device.

The movement attribute is determined based on the tracking signal cycle carried in the tracking configuration information, and the signal strength of the tracking signal sent by the UE based on the tracking configuration information, so that the transmission device can learn the movement attribute of the UE, thereby improving movement attribute accuracy.

According to a third aspect, a device configuration method is provided and is applied to UE that accesses a transmission device. The method includes receiving tracking configuration information sent by the transmission device currently accessed by the UE. The method also includes sending a tracking signal based on the tracking configuration information, where the tracking signal is used to determine a location of the UE.

The tracking configuration information is sent by a management device to each transmission device in a tracking set, the tracking set includes m transmission devices including the transmission device currently accessed by the UE, $1 \leq m < n$, and n is a quantity of transmission devices managed by the management device.

The tracking configuration information is tracking configuration information sent by the management device to each transmission device in the tracking set, so that the management device needs only to send the tracking configuration information to the m transmission devices, thereby resolving a problem that a relatively large quantity of channel resources are occupied because the management device sends the tracking configuration information to all the transmission devices managed by the management device, and saving the channel resources.

With reference to the third aspect, in a first implementation of the third aspect, the receiving tracking configuration information sent by the transmission device currently accessed by the UE includes: sending a movement attribute to the transmission device, and receiving the tracking configuration information sent by the transmission device.

The movement attribute is used to indicate a movement status of the UE, and the movement attribute is reported by the transmission device to the management device, and instructs the management device to configure the tracking configuration information and the tracking set based on the movement attribute.

The movement attribute is sent to the transmission device, so that the transmission device reports the movement attribute to the management device, and the management device is instructed to configure the tracking configuration information and the tracking set based on the movement attribute. Therefore, the transmission device and the management device can obtain the movement attribute without a need of learning, so that processing resources used by the transmission device and the management device for learning are saved.

With reference to the first implementation of the third aspect, in a second implementation of the third aspect, the sending a movement attribute to the transmission device includes: sending the movement attribute to the transmission device using a random channel when accessing the transmission device. Additionally or alternatively, the sending includes sending the movement attribute to the transmission device using RRC signaling or NAS signaling.

According to a fourth aspect, a device configuration apparatus is provided and is applied to a management device that manages n transmission devices, where n≥2. The apparatus includes at least one module, and the at least one module is configured to implement the device configuration method provided in the first aspect or at least one implementation of the first aspect.

According to a fifth aspect, a device configuration apparatus is provided and is applied to m transmission devices in a tracking set determined by a management device, where m≥1. The apparatus includes at least one module, and the at least one module is configured to implement the device configuration method provided in the second aspect or at least one implementation of the second aspect.

According to a sixth aspect, a device configuration apparatus is provided and is applied to UE that accesses a transmission device. The apparatus includes at least one module, and the at least one module is configured to implement the device configuration method provided in the first aspect or at least one implementation of the first aspect.

According to a seventh aspect, a management device is provided, the management device is configured to manage n transmission devices, where n≥2. The management device includes a processor and a transceiver connected to the processor.

The transceiver is configured to be controlled by the processor, and the processor is configured to implement the device configuration method provided in the first aspect or at least one implementation of the first aspect.

According to an eighth aspect, a transmission device is provided, the transmission device is one of m transmission devices in a tracking set determined by a management device, the tracking set is determined by the management device based on n managed transmission devices, where 1≤m<n. The transmission device includes a processor and a transceiver connected to the processor.

The transceiver is configured to be controlled by the processor, and the processor is configured to implement the device configuration method provided in the second aspect or at least one implementation of the second aspect.

According to a ninth aspect, UE is provided, the UE is UE that accesses a transmission device, and the UE includes a processor and a transceiver connected to the processor.

The transceiver is configured to be controlled by the processor, and the processor is configured to implement the device configuration method provided in the third aspect or at least one implementation of the third aspect.

According to a tenth aspect, a computer readable storage medium is provided, the computer readable storage medium stores an instruction, and when the instruction runs on a management device, the instruction enables the management device to perform the device configuration method provided in any one of the first aspect and the possible implementations of the first aspect.

According to an eleventh aspect, a computer readable storage medium is provided, the computer readable storage medium stores an instruction, and when the instruction runs on a transmission device, the instruction enables the transmission device to perform the device configuration method provided in any one of the second aspect and the possible implementations of the second aspect.

According to a twelfth aspect, a computer readable storage medium is provided, the computer readable storage medium stores an instruction, and when the instruction runs on UE, the instruction enables the UE to perform the device configuration method provided in any one of the third aspect and the possible implementations of the third aspect.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

"Module" mentioned in this specification is a functional structure divided based on logic, and the "module" may be implemented only by hardware, or by a combination of hardware and software.

Figure 1:
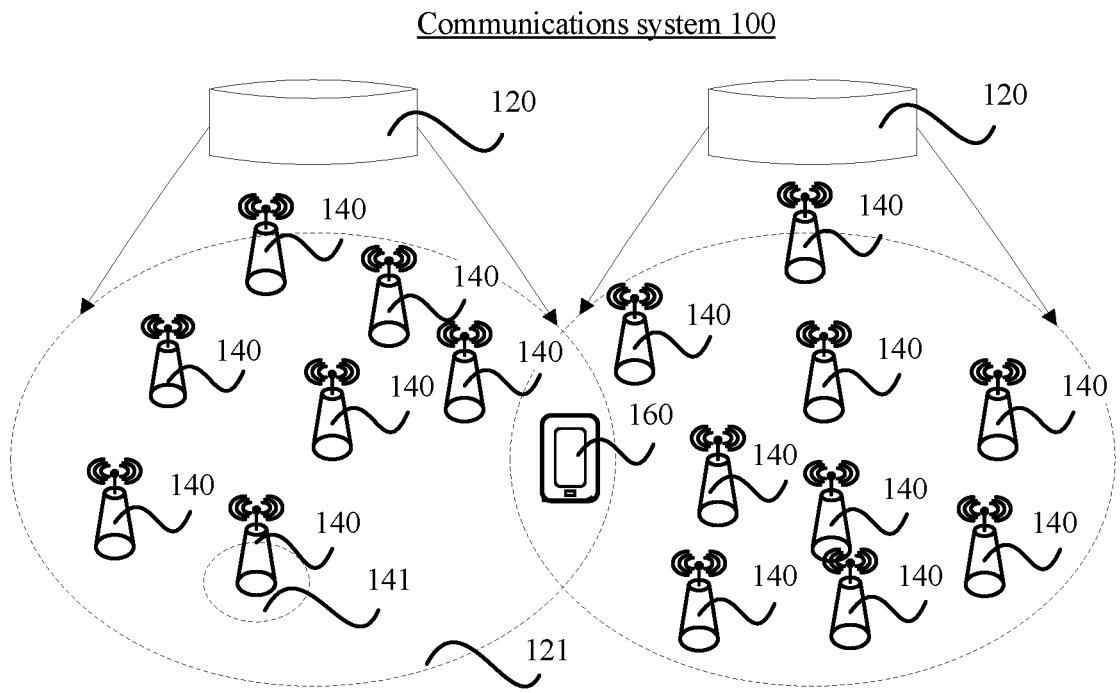
FIG. 1 is a schematic structural diagram of a non-cellular communications system according to an example embodiment of the present invention.

FIG. 1 is a schematic structural diagram of a non-cellular communications system 100 according to an example embodiment of the present invention. The communications system 100 includes a management device 120, a plurality of transmission devices 140 managed by the management device 120, and UE 160 that accesses the transmission devices 140.

The management device 120 may be a logic entity (LE).

The transmission device 140 managed by the management device 120 may be a transmit point (TP), and coverage areas 141 of all transmission devices 140 constitute a coverage area 121 of the management device 120.

UEs 160 may be dispersed in the entire non-cellular communications system 100, and each UE 160 may be static or moving. The UE 160 may further be referred to as a terminal, a mobile station, a subscriber unit, a station, or the like. The UE 160 may be a cellular phone, a personal digital assistant (PDA), a wireless modulator, a wireless communications device, a handheld device, a laptop computer, a cordless phone, a wireless local loop (WLL) station, a smartphone, a tablet computer, a netbook, a smartbook, an ultrabook, an instrument and a meter/a sensor/a monitor (for example, a power meter, a water meter, a heart rate monitor, a temperature sensor, a humidity sensor, or a positioning device), or the like.

Figure 2:
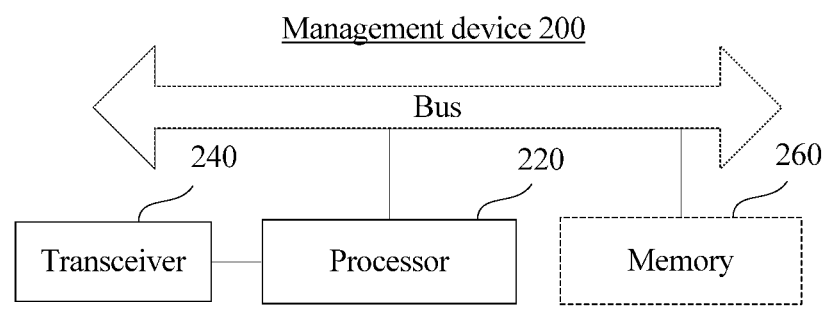
FIG. 2 is a schematic structural diagram of a management device according to an example embodiment of the present invention.

FIG. 2 is a schematic structural diagram of a management device 200 shown in another example embodiment of the present invention. The management device 200 may be the management device 120 shown in FIG. 1, and the management device 200 includes a processor 220 and a transceiver 240 connected to the processor 220.

A person skilled in the art may understand that a structure of the management device 200 shown in FIG. 2 does not constitute a limitation on the management device, and may include more or fewer parts than those shown in the figure, or combine some parts, or have different part arrangements.

The transceiver 240 may include one or more antennas, and the antennas enable the management device 200 to send or receive an electrical signal.

The transceiver 240 may be connected to the processor 220. The processor 220 may be a central processing unit (CPU), a network processor (NP), or a combination of the CPU and the NP. The processor 220 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The management device 200 may further include a memory 260, the memory 260 is connected to the processor 220 using a bus or in another manner, and the memory 260 may be a volatile memory, a non-volatile memory, or a combination thereof. The volatile memory may be a random access memory (RAM), for example, a static random access memory (SRAM) or a dynamic random access memory (DRAM). The nonvolatile memory may be a read-only memory (ROM), for example, a programmable read-only memory (PROM), an erasable programmable read-only memory (EPROM), or an electrically erasable programmable read-only memory (EEPROM). Alternatively, the non-volatile memory may be a flash memory or a magnetic memory, for example, a magnetic tape, a floppy disk, or a hard disk. Alternatively, the non-volatile memory may be a compact disc.

Optionally, the memory 260 may store tracking configuration information configured by the processor 220, a movement attribute of UE that is obtained by the processor 220, and the like. For a specific process, refer to descriptions in the following step 401 and step 402.

It should be noted that a basic structure of the transmission device 140 in the non-cellular communications system 100 is the same as the basic structure of the management device 200. For details of the basic structure of the transmission device 140, refer to content shown in FIG. 2. In addition, a memory in the transmission device 140 stores the tracking configuration information sent by the management device 200, the movement attribute obtained by the processor 220, and the like. For a specific process, refer to step 403.

Figure 3:
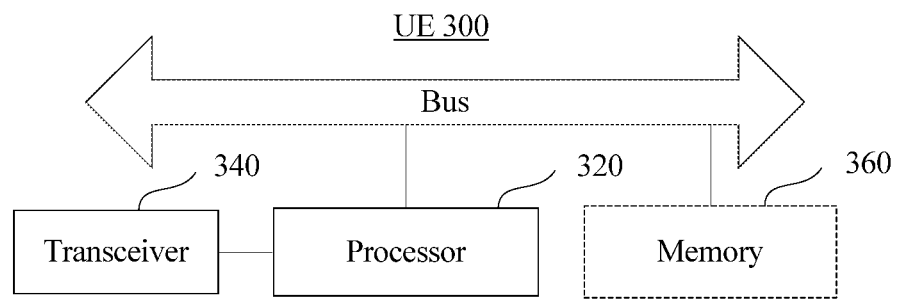
FIG. 3 is a schematic structural diagram of UE according to an example embodiment of the present invention.

FIG. 3 is a schematic structural diagram of UE 300 according to an embodiment of the present invention. The UE 300 may include parts such as a processor 320 and a transceiver 340.

A person skilled in the art may understand that a structure of the UE shown in FIG. 3 does not constitute a limitation on the UE, and may include more or fewer parts than those shown in the figure, or combine some parts, or have different part arrangements.

The transceiver 340 may include one or more antennas, and the antennas enable the UE 300 to send or receive an electrical signal. The transceiver 340 may be connected to the processor 320, and the processor 320 determines sending time of an electrical signal, and controls the transceiver 340 to send the electrical signal at the sending time. For example, the electrical signal is a tracking signal, and the processor 320 determines sending time of the tracking signal, and controls the transceiver 340 to send the tracking signal at the sending time.

The processor 320 may be a central processing unit (CPU), a network processor (NP), or a combination of the CPU and the NP. The processor 320 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The UE 300 may further include a memory 360, the memory 360 is connected to the processor 320 using a bus or in another manner, and the memory 360 may be a volatile memory, a non-volatile memory, or a combination thereof. The volatile memory may be a random access memory (RAM), for example, a static random access memory (SRAM) or a dynamic random access memory (DRAM). The nonvolatile memory may be a read-only memory (ROM), for example, a programmable read-only memory (PROM), an erasable programmable read-only memory (EPROM), or an electrically erasable programmable read-only memory (EEPROM). Alternatively, the non-volatile memory may be a flash memory or a magnetic memory, for example, a magnetic tape, a floppy disk, or a hard disk. Alternatively, the non-volatile memory may be a compact disc.

Optionally, the memory 360 may store tracking configuration information. The tracking configuration information is received by the transceiver 340, and is stored in the memory 360 under the control of the processor 340. For a specific determining process, refer to descriptions in the following step 406.

The UE 300 further includes a power supply (not shown in the figure) that supplies power to each part. Optionally, the power supply may be logically connected to the processor 320 using a power management system, so as to implement functions such as charging and discharging management and power consumption management using the power management system. The power supply may further include any component such as one or more direct current or alternating current power supplies, a rechargeable system, a power supply failure detection circuit, a power supply converter or an inverter, and a power supply status indicator.

Although not shown, the UE 300 may further include a camera, a Bluetooth module, and the like. Details are not described herein.

Figure 4:
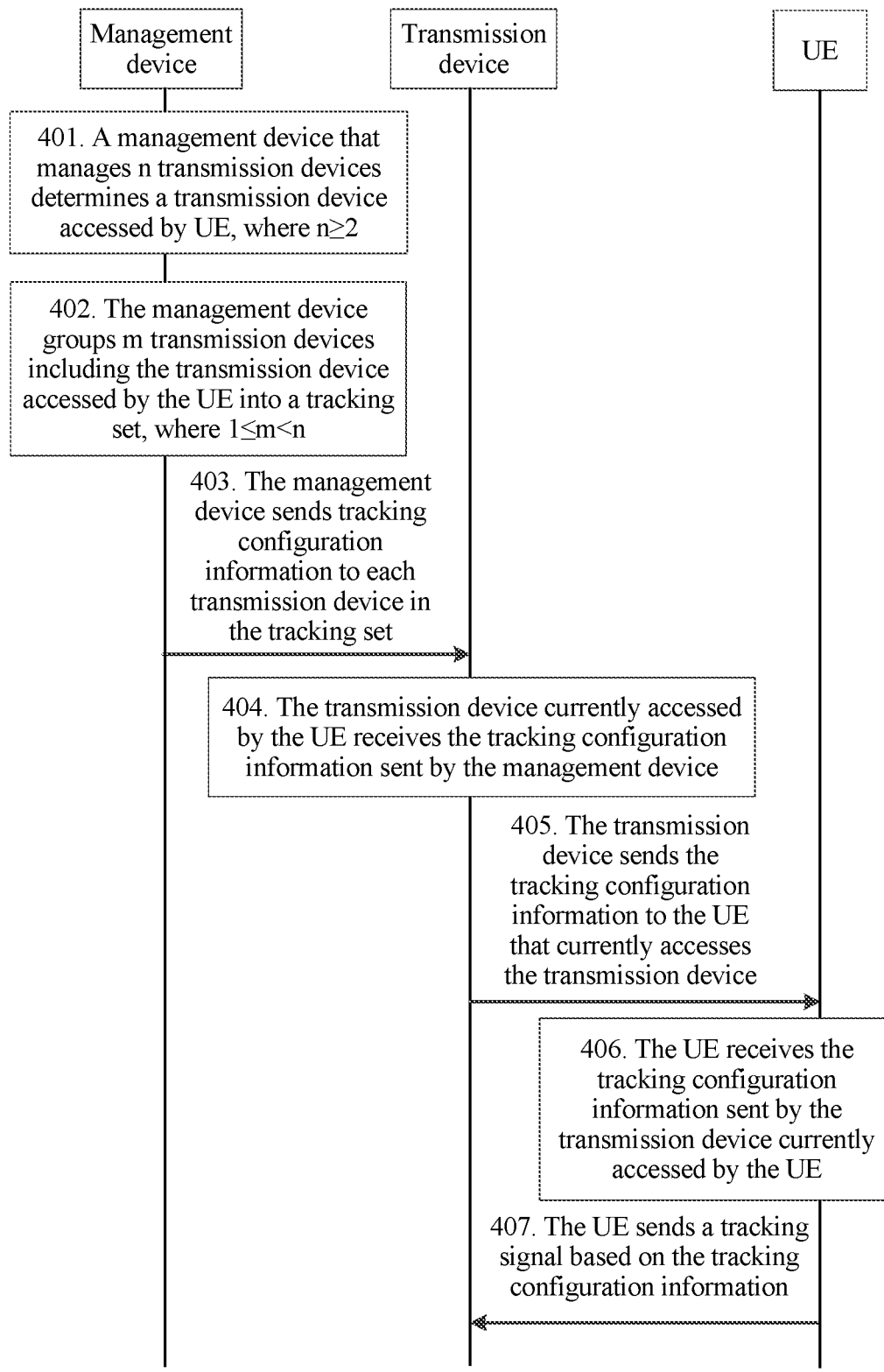
FIG. 4 is a flowchart of a device configuration method according to an example embodiment of the present invention.

FIG. 4 is a flowchart of a device configuration method according to an example embodiment of the present invention. An example in which the method is applied to the non-cellular communications system 100 shown in FIG. 1 is used for description in this embodiment. The method includes the following several steps.

Step 401: A management device that manages n transmission devices determines a transmission device accessed by UE, where $n \geq 2$.

When accessing the non-cellular communications system, the UE needs to send an access request. A plurality of transmission devices receiving the access request report the access request to the management device. The management device determines an access request with greatest signal strength, and determines a transmission device that sends the access request as the transmission device accessed by the UE. When access requests sent by at least two transmission devices have greatest and equal signal strength, the management device selects a transmission device with lowest load from the at least two transmission devices, and determines the transmission device as the transmission device accessed by the UE.

Step 402: The management device groups m transmission devices including the transmission device accessed by the UE into a tracking set, where $1 \leq m < n$.

In an implementation, that the management device groups m transmission devices including the transmission device accessed by the UE into a tracking set includes: determining remaining m−1 transmission devices based on the transmission device accessed by the UE, where a coverage area of at least one of the m−1 transmission devices is adjacent to a coverage area of the transmission device accessed by the UE. The grouping also includes grouping the transmission device accessed by the UE and the remaining m−1 transmission devices into the tracking set.

During establishment of the communications system, a coverage area of each transmission device is adjacent to at least one coverage area, and network locations of all transmission devices form a network topology structure, and the network topology structure is prestored on the management device. In this implementation, the management device determines, based on the network topology structure, the m−1 transmission devices whose coverage areas are adjacent to the coverage area of the transmission device accessed by the UE, and groups the transmission device accessed by the UE and the m−1 adjacent transmission devices into the tracking set. Because the coverage area of each transmission device is necessarily adjacent to a coverage area of at least one other transmission device, the management device necessarily determines, based on the network topology structure, at least one transmission device whose coverage area is adjacent to the coverage area of the transmission device accessed by the UE. In this case, the management device may directly use the at least one transmission device as the m−1 transmission devices in the tracking set. Alternatively, the management device may select the m−1 transmission devices from the at least one transmission device based on a condition such as whether a load value of each transmission device is less than a load threshold, whether the access request sent by the UE is received, or whether signal strength of the access request exceeds a strength threshold when the access request is received. A manner in which the management device determines the m−1 transmission devices in the tracking set and the condition of selecting the m−1 transmission devices are not limited in this embodiment.

When the UE moves, the UE usually moves from a coverage area of a transmission device to a coverage area adjacent to the coverage area. Therefore, a transmission device accessed by the UE after the UE moves is still in the tracking set, so that the UE can receive the tracking configuration information using the transmission device accessed by the UE after the UE moves, thereby improving location tracking accuracy.

In another implementation, that the management device groups m transmission devices including the transmission device accessed by the UE into a tracking set includes: obtaining a movement attribute of the UE, where the movement attribute is used to indicate a movement status of the UE. The grouping also includes grouping, based on the movement attribute, the m transmission devices including the transmission device accessed by the UE into the tracking set.

The movement attribute includes at least a static state and a moving state. The static state is a state in which a moving speed of the UE does not exceed a preset threshold, and the moving state is a state in which the moving speed of the UE exceeds the preset threshold. Usually, the preset threshold is relatively small. For example, the preset threshold is zero or a value slightly greater than zero. The static state may be further divided into a permanently static state and a temporarily static state. In this case, the movement attribute includes at least the permanently static state, the temporarily static state, and the moving state. UE in the permanently static state cannot move. For example, the UE may be a device such as a mainframe computer. UE in the temporarily static state can move, and does not move in only a period of time. For example, the UE may be a device such as a mobile phone or an intelligent wearable device. The moving state may be further divided into a fast moving state and a slowly moving state. In this case, the movement attribute includes at least the permanently static state, the temporarily static state, the fast moving state, and the slowly moving state.

It should be noted that an example in which the static state is divided into the permanently static state and the temporarily static state, and the moving state is divided into the fast moving state and the slowly moving state is used for description in this embodiment. During actual implementation, the static state and the moving state may be further divided into other states. This is not limited in this embodiment.

Specifically, the grouping, based on the movement attribute, the m transmission devices including the transmission device accessed by the UE into the tracking set includes: when the movement attribute of the UE is the static state, grouping the transmission device accessed by the UE into the tracking set. The grouping also includes when the movement attribute of the UE is the moving state, determining remaining m−1 transmission devices based on the transmission device accessed by the UE, where coverage areas of the remaining m−1 transmission devices are adjacent to a coverage area of the transmission device accessed by the UE, and m is positively correlated to a moving speed of the UE.

When the movement attribute of the UE is the static state, because the UE does not move, the UE does not access another transmission device. In this case, only the currently accessed transmission device needs to be configured for the UE, to ensure that the UE can receive the tracking configuration information. When the movement attribute of the UE is the moving state, UE with a fast moving speed passes through a relatively large quantity of coverage areas. In this case, a relatively large quantity of transmission devices need to be configured for the UE, to increase a probability that a transmission device accessed by the UE after the UE moves is still in the tracking set, so as to increase a probability that the UE can receive the tracking configuration information using the transmission device accessed by the UE after the UE moves. UE with a slow moving speed passes through a relatively small quantity of coverage areas. In this case, a relatively small quantity of transmission devices need to be configured for the UE, and a probability that a transmission device accessed by the UE after the UE moves is still in the tracking set can be increased. Therefore, m is positively correlated to the moving speed of the UE.

The determining, when the movement attribute of the UE is the moving state, remaining m−1 transmission devices based on the transmission device accessed by the UE includes: when the moving speed of the UE is less than an $i^{th}$ speed threshold, determining, as the remaining m−1 transmission devices, transmission devices at a first layer to an $i^{th}$ layer that are determined based on the transmission device accessed by the UE. Additionally or alternatively, the determining includes when the moving speed of the UE is greater than an $i^{th}$ speed threshold, determining, as the remaining m−1 transmission devices, transmission devices at a first layer to an $(i+1)^{th}$ layer that are determined based on the transmission device accessed by the UE.

A coverage area of each transmission device at the $i^{th}$ layer is adjacent to a coverage area of a transmission device at the $(i-1)^{th}$ layer, and i≥1. To be specific, a transmission device at the first layer is at least one transmission device whose coverage area is adjacent to the coverage area of the transmission device accessed by the UE, a transmission device at a second layer is at least one transmission device whose coverage area is adjacent to the coverage area of the transmission device at the first layer, a transmission device at a third layer is at least one transmission device whose coverage area is adjacent to the coverage area of the transmission device at the second layer, . . . , and so on.

When the UE moves, the UE usually moves from a coverage area to another coverage area adjacent to the coverage area, and then moves from the adjacent coverage area to another coverage area adjacent to the coverage area, and a higher moving speed of the UE leads to a larger quantity of coverage areas through which the UE passes. Therefore, a transmission device accessed by the UE after the UE moves can be still in the tracking set by determining transmission devices layer by layer based on the moving speed of the UE. If the management device determines the transmission devices in the tracking set only based on whether a coverage area of a transmission device is adjacent to the coverage area of the transmission device accessed by the UE, a same tracking set is configured for UEs that access a same transmission device. If the tracking set includes only the transmission device accessed by the UE and the transmission device at the first layer, a transmission device accessed by the UE with a fast moving speed after the UE moves may not in the tracking set. Consequently, the UE cannot receive the tracking configuration information. If the tracking set includes the transmission device accessed by the UE and transmission devices at least two layers, the UE with a slow moving speed may not access the transmission device at the second layer after the UE moves, but the transmission device at the second layer still needs to track a location of the UE, resulting in a waste of processing resources of the transmission device at the second layer.

Figure 5:
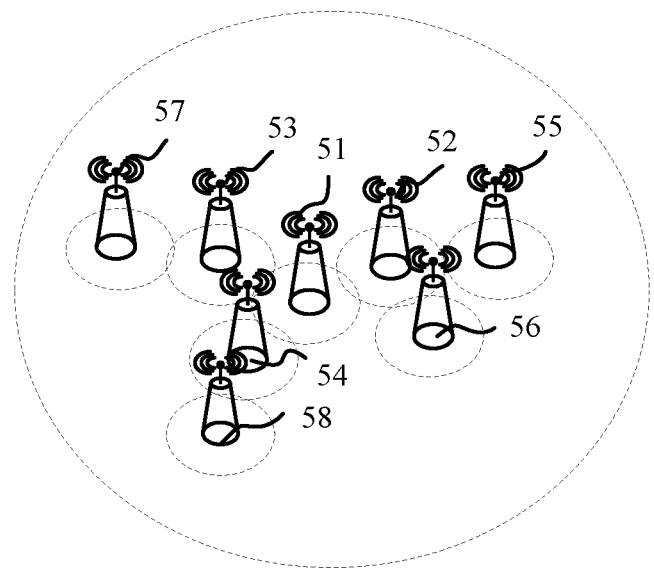
FIG. 5 is a schematic diagram of distribution of transmission devices managed by a management device according to an example embodiment of the present invention.

FIG. 5 is a schematic diagram of distribution of transmission devices managed by a management device. The transmission device accessed by the UE is a transmission device 51. Transmission devices at the first layer that are determined based on the transmission device 51 are transmission devices 52, 53, and 54. Transmission devices at the second layer that are determined based on the transmission device 52 in transmission devices at the first layer are transmission devices 55 and 56. A transmission device at the second layer that is determined based on the transmission device 53 in the transmission devices at the first layer is a transmission device 57. A transmission device at the second layer that is determined based on the transmission device 54 in the transmission devices at the first layer is a transmission device 58.

It is assumed that a speed threshold is set on the management device. If the moving speed of the UE is less than the speed threshold, the transmission devices 52, 53, and 54 in the transmission devices at the first layer are determined as the remaining m−1 transmission devices in the tracking set. If the moving speed of the UE is greater than the speed threshold, the transmission devices 52, 53, and 54 in the transmission devices at the first layer and the transmission devices 55, 56, 57, and 58 in transmission devices at the second layer are determined as the remaining m−1 transmission devices in the tracking set.

For example, transmission devices corresponding to coverage areas through which a moving path of the UE passes are separately the transmission devices 51, 52, and 55, and moving duration is fixed. If the moving speed of the UE is relatively high, the UE may already move, in the moving duration, into the coverage area corresponding to the transmission device 55. Because the tracking set includes the transmission devices at the second layer when the moving speed of the UE is fast, the transmission device 55 is in the tracking set, and the location of the UE may be tracked using the transmission device 55. If the moving speed of the UE is relatively low, the UE may only be able to move, in the moving duration, into the coverage area corresponding to the transmission device 52. Because the tracking set includes only the transmission devices at the first layer when the moving speed of the UE is low, the transmission device 52 is in the tracking set, the location of the UE can be tracked using the transmission device 52, and a channel resource occupied by the management device to send the tracking configuration information to the transmission devices at the second layer after the transmission devices at the second layer join the tracking set can be saved.

In addition, the obtaining a movement attribute of the UE includes: obtaining the movement attribute of the UE that is reported by the transmission device accessed by the UE, where the movement attribute is sent by the UE to the transmission device using a random channel when the UE accesses the transmission device, or the movement attribute is sent by the UE to the transmission device using RRC signaling or NAS signaling. Additionally or alternatively, the obtaining includes determining signal strength of a tracking signal based on the tracking signal sent by the UE, and determining the movement attribute of the UE based on the signal strength and a tracking signal cycle carried in the tracking configuration information, where the tracking signal is sent by the UE based on the tracking configuration information.

When the management device determines the movement attribute of the UE based on the signal strength and the tracking signal cycle carried in the previous information, because the signal strength of the tracking signal is negatively correlated to a distance between the UE and the transmission device, the management device may first determine a variation amount of the signal strength, then determine, based on the variation amount, a moving distance of the UE relative to the transmission device, and obtain the moving speed of the UE relative to the transmission device by dividing the moving distance by the cycle, so as to determine the movement attribute of the UE based on the moving speed of the UE.

Step 403: The management device sends tracking configuration information to each transmission device in the tracking set.

The management device configures the tracking configuration information, and then sends the tracking configuration information to each transmission device in the tracking set. The transmission device currently accessed by the UE sends the tracking configuration information to the UE, to instruct the UE to send a tracking signal based on the tracking configuration information, and the tracking signal is used to determine the location of the UE. The tracking signal is a string of characters. During actual implementation, the tracking signal may be an uplink reference signal.

Because the tracking configuration information needs to instruct the UE to send the tracking signal, the tracking configuration information includes a time-frequency resource of a channel occupied by the UE to send the tracking signal, a tracking signal cycle, and a tracking signal identifier.

When the tracking configuration information includes the time-frequency resource of the channel occupied by the UE to send the tracking signal, configuring the tracking configuration information based on the movement attribute includes: configuring time-frequency resources on a same time-frequency resource block for at least two UEs having a same movement attribute, and configuring time-frequency resources on different time-frequency resource blocks for at least two UEs having different movement attributes, where the same time-frequency resource block means that at least two time-frequency resources belong to a same frequency band and a same time period, and the different time-frequency resource blocks mean that at least two time-frequency resources belong to a same frequency band but different time periods, or the at least two time-frequency resources belong to different frequency bands but a same time period, or the at least two time-frequency resources belong to different frequency bands and different time periods.

The management device configures the time-frequency resources on the same time-frequency resource block for the at least two UEs having the same movement attribute, and configures the time-frequency resources on the different time-frequency resource blocks for the at least two UEs having the different movement attributes, so that when the at least two UEs having the different movement attributes send a same tracking signal, the transmission device can determine, based on the time-frequency resource blocks corresponding to the time-frequency resources used by the UEs to send the tracking signal, specific UE that sends the tracking signal, so as to multiplex the same tracking signal on the different time-frequency resource blocks.

Figure 6:
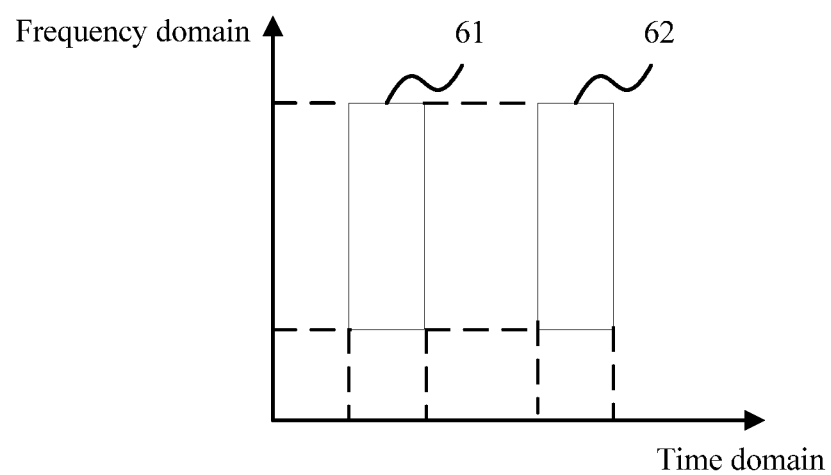
FIG. 6 is a schematic diagram of a first type of time-frequency resource block according to an example embodiment of the present invention.

FIG. 6 is a schematic diagram of a first type of time-frequency resource block. At least two time-frequency resources on different time-frequency resource blocks belong to a same frequency band but different time periods. For example, a time-frequency resource block configured for UE in the static state is a time-frequency resource block 61, and a time-frequency resource block configured for UE in the moving state is a time-frequency resource block 62.

Figure 7:
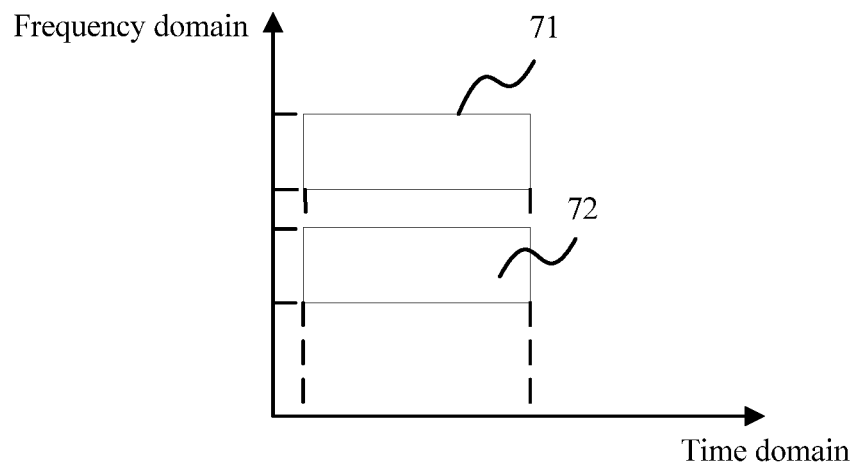
FIG. 7 is a schematic diagram of a second type of time-frequency resource block according to an example embodiment of the present invention.

FIG. 7 is a schematic diagram of a second type of time-frequency resource block. At least two time-frequency resources on different time-frequency resource blocks belong to different frequency bands but a same time period. For example, a time-frequency resource block configured for UE in the static state is a time-frequency resource block 71, and a time-frequency resource block configured for UE in the moving state is a time-frequency resource block 72.

Figure 8:
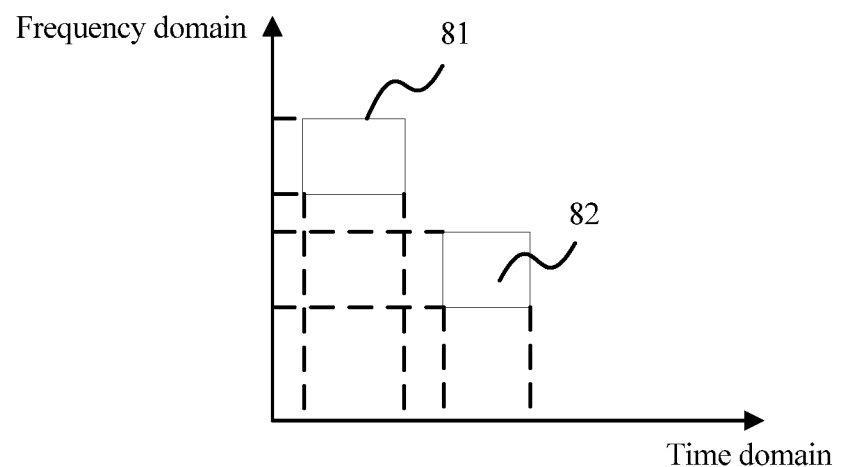
FIG. 8 is a schematic diagram of a third type of time-frequency resource block according to an example embodiment of the present invention.

FIG. 8 is a schematic diagram of a third type of time-frequency resource block. At least two time-frequency resources on different time-frequency resource blocks belong to different frequency bands and different time periods. For example, a time-frequency resource block configured for UE in the static state is a time-frequency resource block 81, and a time-frequency resource block configured for UE in the moving state is a time-frequency resource block 82.

When the tracking configuration information further includes the tracking signal cycle, the configuring the tracking configuration information based on the movement attribute includes: configuring a cycle greater than a preset threshold for UE whose movement attribute is the static state. The configuring also includes configuring a cycle less than the preset threshold for UE whose movement attribute is the moving state.

Because signal strength of a tracking signal sent by the UE in the static state varies very slightly, even if a relatively long tracking signal sending cycle is configured for the UE in the static state, tracking signal detection accuracy of the transmission device is still relatively high, and the transmission device can detect, in each cycle, tracking signals sent by more UEs. This increases a maximum quantity of UEs allowed to access the transmission device. In addition, in a same time period, a quantity of times of sending a tracking signal by UE with a long cycle is less than a quantity of times of sending a tracking signal by UE with a short cycle. This saves a channel resource occupied for sending a tracking signal. Because signal strength of a tracking signal sent by the UE in the moving state varies very significantly, a relatively short tracking signal sending cycle needs to be configured for the UE in the moving state, so as to improve tracking signal detection accuracy of the transmission device.

It should be noted that the transmission device receives, based on the cycle, the tracking signal sent by the UE.

When the tracking configuration information further includes the tracking signal identifier, the configuring the tracking configuration information based on the movement attribute includes: configuring identifiers of tracking signals with different lengths but a same root sequence for at least two UEs having different movement attributes. Additionally or alternatively, the configuring includes configuring identifiers of tracking signals with a same length but different root sequences for at least two UEs having different movement attributes.

The different lengths of the tracking signals are different character string lengths, and the different root sequences of the tracking signals are different orthogonal sets to which character strings belong.

The management device configures different tracking signal identifiers for the at least two UEs having the different movement attributes, so that when the UEs send, using a same time-frequency resource, tracking signals corresponding to the different identifiers, the transmission device can determine, based on the tracking signals, specific UE that sends the tracking signal. Therefore, different UEs can send tracking signals using a same time-frequency resource, so that time-frequency resources are saved.

After the tracking configuration information is configured, that the management device sends the tracking configuration information to each transmission device in the tracking set includes: sending the tracking configuration information to each transmission device in the tracking set. Additionally or alternatively, the sending includes sending the tracking configuration information to the transmission device accessed by the UE, where the transmission device accessed by the UE sends the tracking configuration information to the remaining m−1 transmission devices in the tracking set.

In an implementation, if transmission pressure of the management device is relatively high, the management device sends the tracking configuration information only to the transmission device currently accessed by the UE, and the transmission device currently accessed by the UE forwards the tracking configuration information to the remaining m−1 transmission devices in the tracking set. In this case, the management device further needs to send identifiers of the remaining m−1 transmission devices to the transmission device currently accessed by the UE, so that the transmission device currently accessed by the UE can forward the tracking configuration information to the transmission devices based on the identifiers. The identifiers may be identities (IDs), domain names (DNs), or the like of the remaining m−1 transmission devices. This is not limited in this embodiment. The tracking configuration information is sent to the transmission device accessed by the UE, so that the management device needs to send the tracking configuration information to only one transmission device. This reduces the transmission pressure of the management device.

In another implementation, if transmission pressure of the transmission device accessed by the UE is relatively high, the management device sends the tracking configuration information to each transmission device in the tracking set. The tracking configuration information is sent to each transmission device in the tracking set, so that the transmission device accessed by the UE does not need to send the tracking configuration information to the remaining m−1 transmission devices in the tracking set. This reduces the transmission pressure of the transmission device.

It should be noted that, in the foregoing two implementations, all the transmission devices in the tracking set can receive the tracking configuration information sent by the management device. In this case, only the transmission device currently accessed by the UE sends the tracking configuration information to the UE, in other words, step 404 is performed, and the remaining m−1 transmission devices do not send the tracking configuration information to the UE.

Step 404: The transmission device currently accessed by the UE receives the tracking configuration information sent by the management device.

Before the transmission device receives the tracking configuration information sent by the management device, the method further includes: obtaining the movement attribute of the UE, where the movement attribute is used to indicate the movement status of the UE. The method also includes sending the movement attribute to the management device, where the movement attribute is used to instruct the management device to configure the tracking configuration information and the tracking set.

The obtaining the movement attribute of the UE includes: obtaining the movement attribute sent by the UE using a random channel when the UE accesses the transmission device. Additionally or alternatively, the obtaining includes obtaining the movement attribute sent by the UE using RRC signaling or NAS signaling. Additionally or alternatively, the determining includes determining the movement attribute of the UE based on the tracking signal cycle carried in the tracking configuration information, and the signal strength of the tracking signal sent by the UE based on the tracking configuration information.

A process in which the transmission device determines the movement attribute of the UE is the same as a process in which the management device determines the movement attribute of the UE, and details are not described herein again.

Specifically, the receiving the tracking configuration information sent by the management device includes: receiving the tracking configuration information and the identifiers of the remaining m−1 transmission devices in the tracking set that are sent by the management device, and forwarding the tracking configuration information to the remaining m−1 transmission devices. Additionally or alternatively, the receiving includes receiving the tracking configuration information sent by the management device.

Step 405: The transmission device sends the tracking configuration information to the UE that currently accesses the transmission device.

The tracking configuration information sent by the transmission device to the UE that currently accesses the transmission device is the same as the tracking configuration information sent by the management device to the transmission device.

Step 406: The UE receives the tracking configuration information sent by the transmission device currently accessed by the UE.

Before receiving the tracking configuration information sent by the transmission device currently accessed by the UE, the UE further needs to send the movement attribute to the transmission device. The transmission device reports the movement attribute to the management device, to instruct the management device to configure the tracking configuration information and the tracking set based on the movement attribute.

Specifically, the sending the movement attribute to the transmission device includes: when accessing the transmission device, sending the movement attribute to the transmission device using a random channel. Additionally or alternatively, the sending includes sending the movement attribute to the transmission device using RRC signaling or NAS signaling.

Step 407: The UE sends a tracking signal based on the tracking configuration information.

The UE determines the tracking signal based on the tracking signal identifier included in the tracking configuration information, and then sends, based on the tracking signal cycle included in the tracking configuration information, the tracking signal on a time-frequency resource included in the tracking configuration information.

Each transmission device detects the signal strength of the tracking signal sent by the UE, determines a distance between the UE and the transmission device and a moving path of the UE based on the signal strength, and reports the distance and the moving path to the management device. The management device determines the location of the UE based on the distance and a location of the transmission device that reports the distance.

The management device predicts, based on the location and the moving path, a transmission device to be accessed by the UE, and adds, to the tracking set, k transmission devices including the transmission device to be accessed by the UE, and k<n.

The k transmission devices may include a transmission device whose coverage area is adjacent to a coverage area of the transmission device to be accessed by the UE.

Optionally, the management device may delete a transmission device that is in the tracking set and that has been accessed by the UE. A process in which the management device updates the tracking set is the same as a process in which the management device determines the tracking set, and details are not described herein again.

It should be noted that step 401 to step 403 may be independently implemented as a method embodiment on a management device side, step 404 and step 405 may be independently implemented as a method embodiment on a transmission device side, and step 406 and step 407 may be independently implemented as a method embodiment on a UE side. This is not limited in this embodiment.

In conclusion, in the device configuration method provided in this embodiment, the tracking set is determined based on the transmission device accessed by the UE, and the tracking configuration information is sent to the transmission devices in the tracking set, so that the management device does not need to send the tracking configuration information to all the transmission devices managed by the management device, thereby resolving a problem that a relatively large quantity of channel resources are occupied because the management device sends the tracking configuration information to all the transmission devices managed by the management device, and saving the channel resources.

In addition, when the movement attribute of the UE is the static state, because the UE does not move, the UE does not access another transmission device. In this case, only the currently accessed transmission device needs to be configured for the UE, to ensure that the UE can receive the tracking configuration information. When the movement attribute of the UE is the moving state, UE with a fast moving speed passes through a relatively large quantity of coverage areas. In this case, a relatively large quantity of transmission devices need to be configured for the UE, to increase a probability that a transmission device accessed by the UE after the UE moves is still in the tracking set, so as to increase a probability that the UE can receive the tracking configuration information using the transmission device accessed by the UE after the UE moves. UE with a slow moving speed passes through a relatively small quantity of coverage areas. In this case, a relatively small quantity of transmission devices need to be configured for the UE, and it can be ensured that a transmission device accessed by the UE after the UE moves is still in the tracking set, so that the UE can receive the tracking configuration information using the transmission device accessed by the UE after the UE moves, and a channel resource occupied by the management device to send the tracking configuration information to the transmission devices in the tracking set can be reduced.

In addition, the time-frequency resources on the same time-frequency resource block are configured for the at least two UEs having the same movement attribute, and the time-frequency resources on the different time-frequency resource blocks are configured for the at least two UEs having the different movement attributes, so that when the at least two UEs having the different movement attributes send a same tracking signal, the transmission device can determine, based on the time-frequency resource blocks corresponding to the time-frequency resources used by the UEs to send the tracking signal, specific UE that sends the tracking signal, so as to multiplex the same tracking signal on the different time-frequency resource blocks.

In addition, because signal strength of a tracking signal sent by the UE in the static state varies very slightly, even if a relatively long tracking signal sending cycle is configured for the UE in the static state, tracking signal detection accuracy of the transmission device is still relatively high, and the transmission device can detect, in each cycle, tracking signals sent by more UEs. This increases a maximum quantity of UEs allowed to access the transmission device. In addition, in a same time period, a quantity of times of sending a tracking signal by UE with a long cycle is less than a quantity of times of sending a tracking signal by UE with a short cycle. This saves a channel resource occupied for sending a tracking signal. Because signal strength of a tracking signal sent by the UE in the moving state varies very significantly, a relatively short tracking signal sending cycle needs to be configured for the UE in the moving state, so as to improve tracking signal detection accuracy of the transmission device.

In addition, the different tracking signal identifiers are configured for the at least two UEs having the different movement attributes, so that when the UEs send, using a same time-frequency resource, tracking signals corresponding to the different identifiers, the transmission device can determine, based on the tracking signals, specific UE that sends the tracking signal. Therefore, different UEs can send tracking signals using a same time-frequency resource, so that time-frequency resources are saved.

Figure 9:
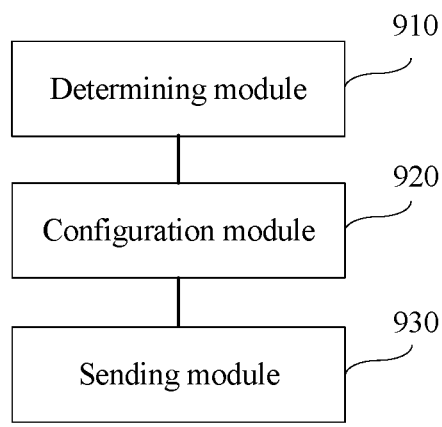
FIG. 9 is a structural diagram of an apparatus of a management device according to an example embodiment of the present invention.

FIG. 9 is a structural diagram of an apparatus of a management device according to an embodiment of the present invention. The apparatus of the device may be implemented as an entirety or a part of the management device using software, hardware, or a combination thereof. The apparatus may include a determining module 910, a configuration module 920, and a sending module 930.

The determining module 910 is configured to implement a function in the foregoing step 401.

The configuration module 920 is configured to implement a function in the foregoing step 402.

The sending module 930 is configured to implement a function in the foregoing step 403.

For related details, refer to the method embodiment shown in FIG. 4.

It should be noted that the determining module 910 may be implemented using a processor in the management device, the configuration module 920 may be implemented using the processor in the management device, and the sending module 930 may determine sending time using the processor in the management device, and be implemented using a transceiver.

Figure 10:
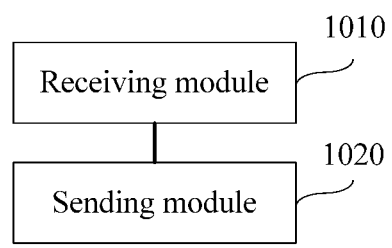
FIG. 10 is a structural diagram of an apparatus of a transmission device according to an example embodiment of the present invention.

FIG. 10 is a structural diagram of an apparatus of a transmission device according to an embodiment of the present invention. The apparatus of the device may be implemented as an entirety or a part of the transmission device using software, hardware, or a combination thereof. The apparatus may include a receiving module 1010 and a sending module 1020.

The receiving module 1010 is configured to implement a function in the foregoing step 404.

The sending module 1020 is configured to implement a function in the foregoing step 405.

For related details, refer to the method embodiment shown in FIG. 4.

It should be noted that the receiving module 1010 may be implemented using a transceiver in the transmission device, and the sending module 1020 may determine sending time using a processor in the transmission device, and be implemented using the transceiver.

Figure 11:
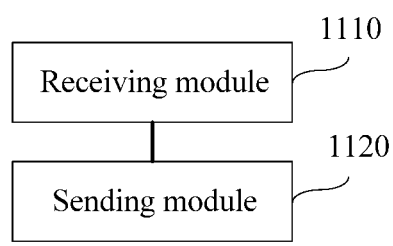
FIG. 11 is a structural diagram of an apparatus of UE according to an example embodiment of the present invention.

FIG. 11 is a structural diagram of an apparatus of UE according to an embodiment of the present invention. The apparatus of the device may be implemented as an entirety or a part of the UE using software, hardware, or a combination thereof. The apparatus may include a receiving module 1110 and a sending module 1120.

The receiving module 1110 is configured to implement a function in the foregoing step 405.

The sending module 1120 is configured to implement a function in the foregoing step 406.

For related details, refer to the method embodiment shown in FIG. 4.

It should be noted that the receiving module 1110 may be implemented using a transceiver in the UE, and the sending module 1120 may determine sending time using a processor in the UE, and be implemented using the transceiver.

A person of ordinary skill in the art may be aware that, in combination with the examples described in the embodiments disclosed in this specification, modules and algorithm steps may be implemented by electronic hardware or a combination of computer software and electronic hardware. Whether the functions are performed by hardware or software depends on particular applications and design constraint conditions of the technical solutions.

It may be clearly understood by a person of ordinary skill in the art that, for ease and brief description, for a detailed working process of the foregoing apparatus and module, refer to a corresponding process in the foregoing method embodiment, and details are not described herein again.

In the embodiments provided in this application, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed.

The modules described as separate parts may or may not be physically separate, and parts displayed as modules may or may not be physical modules, may be located in one position, or may be distributed on a plurality of network modules. Some or all the modules may be selected based on actual requirements to achieve the objectives of the solutions of the embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    receiving, by a management device from at least two transmission devices, in response to a user equipment (UE) sending an access request requesting access to a communications system that comprises the management device, a plurality of access request reports indicating the access request from the UE, wherein the at least two transmission devices comprise n transmission devices managed by the management device, n being greater than or equal to 2;
    determining, by the management device, a first transmission device accessed by the UE, according to the plurality of access request reports, wherein the first transmission device is one of the n transmission devices;
    grouping, by the management device, m transmission devices into a plurality of layers in a tracking set, wherein a first corresponding coverage area of a second transmission device at a first layer of the plurality of layers is adjacent to a second corresponding coverage area of a third transmission device at a second layer of the plurality of layers, wherein the m transmission devices includes the first transmission device, m is greater than or equal to one, and m is less than n; and
    sending, by the management device, tracking configuration information to each transmission device in the tracking set, wherein the tracking configuration information is sent to the UE by the first transmission device, wherein the tracking configuration information instructs the UE to send a tracking signal, and the tracking signal is used to determine a location of the UE.

2. The method according to claim 1, wherein grouping the m transmission devices into the tracking set comprises:
    obtaining a movement attribute of the UE, wherein the movement attribute indicates a movement status of the UE; and
    grouping the m transmission devices into the tracking set based on the movement attribute of the UE.

3. The method according to claim 2, wherein grouping the m transmission devices into the tracking set based on the movement attribute of the UE comprises:
    grouping the first transmission device into the tracking set; and
    determining a remaining mi transmission devices based on the first transmission device, wherein coverage areas of transmission devices at the first layer of the tracking set are adjacent to a coverage area of the first transmission device, and wherein m is positively correlated to a moving speed of the UE.

4. The method according to claim 3, wherein obtaining the movement attribute of the UE comprises:
    obtaining the movement attribute of the UE that is reported by the first transmission device, wherein the movement attribute is sent by the UE to the first transmission device using a random channel when the UE accesses the first transmission device, or the movement attribute is sent by the UE to the first transmission device using radio resource control (RRC) signaling or network attached storage (NAS) signaling; or
    determining a signal strength of the tracking signal based on the tracking signal sent by the UE, and determining the movement attribute of the UE based on the signal strength and a tracking signal cycle carried in the tracking configuration information, wherein the tracking signal is sent by the UE based on the tracking configuration information.

5. The method according to claim 2, wherein sending the tracking configuration information to each transmission device in the tracking set comprises:
configuring the tracking configuration information based on the movement attribute of the UE; and
sending the tracking configuration information to each transmission device in the tracking set, or sending the tracking configuration information to the first transmission device, causing the first transmission device to send the tracking configuration information to a remaining mi transmission devices in the tracking set.

6. The method according to claim 5, wherein the tracking configuration information comprises a time-frequency resource of a channel occupied by the tracking signal, and the configuring the tracking configuration information based on the movement attribute of the UE comprises:
configuring first time-frequency resources on a same time-frequency resource block for at least two UEs having a same movement attribute, wherein the first time-frequency resources on the same time-frequency resource block belong to a same frequency band and a same time period; and
configuring second time-frequency resources on different time-frequency resource blocks for at least two UEs having different movement attributes, wherein the second time-frequency resources on the different time-frequency resource blocks belong to a same frequency band and different time periods, or the second time-frequency resources on the different time-frequency resource blocks belong to different frequency bands and a same time period, or the second time-frequency resources on the different time-frequency resource blocks belong to different frequency bands and different time periods.

7. A method, comprising:
sending, by a transmission device to a management device, in response to a user equipment (UE) sending an access request requesting access to a communications system that comprises the management device, an access request report indicating the access request from the UE, causing the management device to determine the transmission device as a first transmission device according to a plurality of access request reports from n transmission devices managed by the management device;
receiving, by the transmission device, tracking configuration information sent by the management device, wherein the transmission device is currently accessed by the UE, wherein the transmission device is one of m transmission devices in a tracking set, the m transmission devices are grouped into a plurality of layers in the tracking set by the management device from among the n transmission devices managed by the management device, wherein a first corresponding coverage area of a second transmission device at a first layer of the plurality of layers is adjacent to a second corresponding coverage area of a third transmission device at a second layer of the plurality of layers, wherein m is greater than or equal to one, and wherein m is less than n; and
sending the tracking configuration information to the UE, wherein the tracking configuration information instructs the UE to send a tracking signal, and the tracking signal is used to determine a location of the UE.

8. The method according to claim 7, wherein before receiving the tracking configuration information sent by the management device, the method further comprises:
obtaining a movement attribute of the UE, wherein the movement attribute indicates a movement status of the UE; and
sending the movement attribute of the UE to the management device, wherein the movement attribute instructs the management device to configure the tracking configuration information and the tracking set.

9. The method according to claim 8, wherein the tracking configuration information comprises a time-frequency resource of a channel occupied by the tracking signal, and sending the tracking configuration information to the UE comprises:
sending first time-frequency resources on a same time-frequency resource block to at least two first UEs having a same movement attribute, wherein the first time-frequency resources on the same time-frequency resource block belong to a same frequency band and a same time period; and
sending second time-frequency resources on different time-frequency resource blocks to at least two UEs having different movement attributes, wherein the second time-frequency resources on the different time-frequency resource blocks belong to a same frequency band and different time periods, or the second time-frequency resources on the different time-frequency resource blocks belong to different frequency bands and a same time period, or the second time-frequency resources on the different time-frequency resource blocks belong to different frequency bands and different time periods.

10. The method according to claim 7, wherein receiving the tracking configuration information comprises:
receiving the tracking configuration information and identifiers of a remaining m−1 transmission devices in the tracking set that are sent by the management device, and forwarding the tracking configuration information to the remaining m−1 transmission devices; or
receiving the tracking configuration information sent by the management device, wherein the tracking configuration information is sent by the management device to each transmission device in the tracking set.

11. An apparatus, comprising:
a processor;
a transceiver, connected to the processor; and
a non-transitory computer-readable storage medium storing a program to be executed by the processor, the program including instructions for:
receiving, from at least two transmission devices, in response to a user equipment (UE) sending an access request requesting access to a communications system that comprises the apparatus, a plurality of access request reports indicating the access request from the UE, wherein the at least two transmission devices comprise n transmission devices managed by the apparatus, n being greater than or equal to 2;
determining a first transmission device accessed by the UE, according to the plurality of access request reports, wherein the first transmission device is one of the n transmission devices;
grouping m transmission devices into a plurality of layers in a tracking set, wherein a first corresponding coverage area of a second transmission device at a first layer of the plurality of layers is adjacent to a second corresponding coverage area of a third transmission device at a second layer of the plurality of layers, wherein the m transmission devices includes the first transmission device, m is greater than or equal to one, and m is less than n; and sending, using the transceiver, tracking configuration information to each transmission device in the tracking set, wherein the tracking configuration information is sent to the UE by the first transmission device, wherein the tracking configuration information instructs the UE to send a tracking signal, and the tracking signal is used to determine a location of the UE.

12. The apparatus according to claim 11, wherein the program further includes instructions for:

obtaining a movement attribute of the UE, wherein the movement attribute indicates a movement status of the UE; and grouping the m transmission devices comprising the first transmission device into the tracking set based on the movement attribute of the UE.

13. The apparatus according to claim 12, wherein the program further includes instructions for:

grouping the first transmission device into the tracking set; and determining a remaining m−1 transmission devices based on the first transmission device, wherein coverage areas of transmission devices at the first layer of the tracking set are adjacent to a coverage area of the first transmission device, and wherein m is positively correlated to a moving speed of the UE.

14. The apparatus according to claim 13, wherein the program further includes instructions for:

obtaining, using the transceiver, the movement attribute of the UE that is reported by the first transmission device, wherein the movement attribute is sent by the UE to the first transmission device using a random channel when the UE accesses the first transmission device, or the movement attribute is sent by the UE to the first transmission device using radio resource control (RRC) signaling or network attached storage (NAS) signaling; or determining a signal strength of the tracking signal based on the tracking signal sent by the UE, and determining the movement attribute of the UE based on the signal strength and a tracking signal cycle carried in the tracking configuration information, wherein the tracking signal is sent by the UE based on the tracking configuration information.

15. The apparatus according to claim 12, wherein the program further includes instructions for:

configuring the tracking configuration information based on the movement attribute; and sending, using the transceiver, the tracking configuration information to each transmission device in the tracking set, or sending the tracking configuration information to the first transmission device, causing the first transmission device to send the tracking configuration information to a remaining m−1 transmission devices in the tracking set.

16. The apparatus according to claim 15, wherein:

the tracking configuration information comprises a time-frequency resource of a channel occupied by the tracking signal; and the program further includes instructions for:

configuring first time-frequency resources on a same time-frequency resource block for at least two first UEs having a same movement attribute, wherein the first time-frequency resources on the same time-frequency resource block belong to a same frequency band and a same time period; and configuring second time-frequency resources on different time-frequency resource blocks for at least two second UEs having different movement attributes, wherein the second time-frequency resources on the different time-frequency resource blocks belong to a same frequency band and different time periods, or the second time-frequency resources on the different time-frequency resource blocks belong to different frequency bands and a same time period, or the second time-frequency resources on the different time-frequency resource blocks belong to different frequency bands and different time periods.

17. An apparatus, comprising a transceiver, and the transceiver is configured to:

send, to a management device, in response to a user equipment (UE) sending an access request requesting access to a communications system that comprises the management device, an access request report indicating the access request from the UE, causing the management device to determine the apparatus as a first transmission device according to a plurality of access request reports from n transmission devices managed by the management device;

receive tracking configuration information sent by the management device, wherein the apparatus is comprised in the first transmission device, and the first transmission device is currently accessed by the UE, wherein the first transmission device is one of m transmission devices in a tracking set, the m transmission devices are grouped into a plurality of layers in the tracking set by the management device from among the n transmission devices managed by the management device, wherein a first corresponding coverage area of a second transmission device at a first layer of the plurality of layers is adjacent to a second corresponding coverage area of a third transmission device at a second layer of the plurality of layers, wherein m is greater than or equal to one, and wherein m is less than n; and send the tracking configuration information to the UE, wherein the tracking configuration information instructs the UE to send a tracking signal, and the tracking signal is used to determine a location of the UE.

18. The apparatus according to claim 17, wherein the transceiver is further configured to:

before receiving the tracking configuration information sent by the management device, obtain a movement attribute of the UE, wherein the movement attribute indicates a movement status of the UE; and send the movement attribute of the UE to the management device, wherein the movement attribute is instructs the management device to configure the tracking configuration information and the tracking set.

19. The apparatus according to claim 18, wherein the tracking configuration information comprises a time-frequency resource of a channel occupied by the tracking signal, and the transceiver is further configured to:

send first time-frequency resources on a same time-frequency resource block to at least two first UEs having a same movement attribute, wherein the first time-frequency resources on the same time-frequency resource block belong to a same frequency band and a same time period; and send second time-frequency resources on different time-frequency resource blocks to at least two second UEs having different movement attributes, wherein the second time-frequency resources on the different time-frequency resource blocks belong to a same frequency band and different time periods, or the second time-frequency resources on the different time-frequency resource blocks belong to different frequency bands and a same time period, or the second time-frequency resources on the different time-frequency resource blocks belong to different frequency bands and different time periods.

20. The apparatus according to claim 17, wherein the transceiver is further configured to:

receive the tracking configuration information and identifiers of remaining m–1 transmission devices in the tracking set that are sent by the management device, and forward the tracking configuration information to the remaining m–1 transmission devices; or receive the tracking configuration information sent by the management device, wherein the tracking configuration information is sent by the management device to each transmission device in the tracking set.

* * * * *